Figure 1:
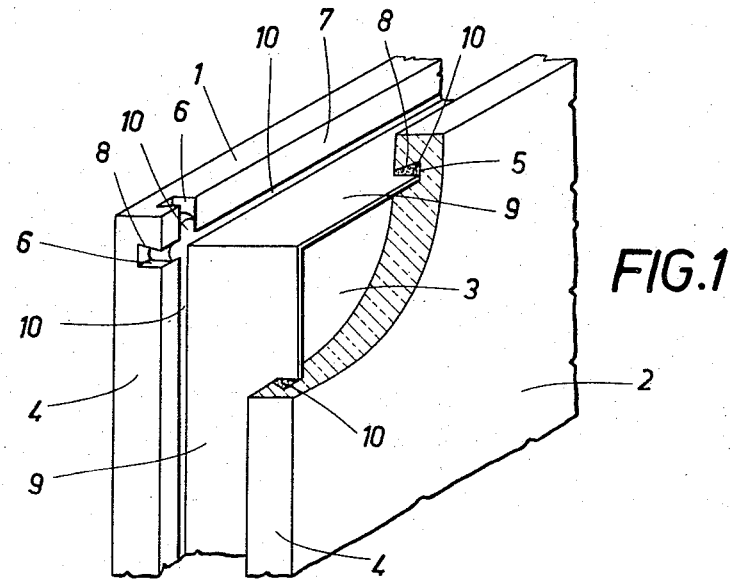

United States Patent Office 3,314,204
Patented Apr. 18, 1967

3,314,204
COMPOSITE PANEL
Hans Zöpnek, Hessenplatz 8, Linz, Austria
Filed Feb. 25, 1964, Ser. No. 347,185
Claims priority, application Austria, Jan. 21, 1964,
A 418/64
2 Claims. (Cl. 52—308)

This invention relates to a composite panel, which comprises at least two spaced apart, parallel glass sheets having plane surfaces facing each other, which define between themselves a space which is closed toward the outside by sealing strips or the like, which are applied and connected to the glass sheets adjacent to their edges. Provided that such composite glass panels can be maintained sufficiently tight, they have the basic advantage that they enable a simplification in glass structures, such as window wings, and provide at the same time for a good protection of the sheets against fogging, and for good heat insulating properties.

In a known composite glass panel of the type defined above, the space between the sheets is sealed by sealing strips or the like which are soldered in position. For this purpose, the edge portion of the facing surfaces of the glass sheets is vapor coated with a metal layer, to which metal strips are soldered. The sealing strips are then soldered to these metal strips. This fixation of the sealing strips is very expensive because the metal layer formed by vapor coating contains a substantial proportion of oxides, which have been formed during the vapor coating operation and cannot be soldered. For this reason, a reduction of the layer formed by vapor coating must be effected. This layer must then be prepared for the soldering operation by the application of a flux. Finally, the strips must be soldered in position. The edge portion of the glass sheet is subjected to a substantial temperature rise during the vapor coating, reducing and various soldering operations. This temperature rise results in strains in the glass sheets. The work must be carried out with utmost care in order to avoid an overheating of the glass beyond the critical temperature particularly in the highly susceptible edge portion of the sheets. In spite of the expensive steps, leaks may form in this composite glass panel at the soldered joints, which separate the space between the glass sheets from the outside air. Such leaks have an adverse effect on the insulating value of the composite glass panel so that the sheets may become fogged on the inside, which is not accessible. The leaks may start mainly at the soldered joints, and may be formed as a result of corrosion and of even extremely small defects in the soldered joints or alternating stresses, which may be caused even by fluctuations of the atmospheric air pressure. The space between the glass sheets contains an air cushion, which is under normal or subatmospheric pressure, so that fluctuations of the atmospheric air pressure will result in changes of the pressure differential between the internal space and the outside air. Further pressure differentials are due to temperature rises and drops of the air cushion in the space between the sheets. As has been stated above, these alternating stresses may cause a formation of leaks at the soldered joints in the course of time.

In view of the above-mentioned disadvantages, it has already been attempted to make composite glass panels having a sealed internal space by heating the edge portions of the glass sheets and then bending these edge portions toward each other and fusing them together. Owing to the high temperature-induced stresses set up during the bending and fusing of the edge portions of the sheets, such composite glass panels can be made only to a limited size. Nevertheless, they are particularly liable to fracture owing to the high stresses and to the strains which are due to the heat treatment. For instance, the shipment of such composite glass panels on mountain roads or by aircraft may cause fracture owing to the reduction of the outer air pressure.

All disadvantages which have been pointed out are eliminated by the invention. The same relates to a composite glass panel of the type defined initially hereinbefore and wherein the edge portions of the sealing strips or the like are held in grooves or the like in the glass sheets. Because the outer edge portions of the sealing strips are inserted into grooves of the glass sheets, a seal due to shape is obtained at the joint between the glass sheets and the sealing strips. The grooves may be formed virtually in all usual window glass panes without a particularly high expenditure by grinding or even rolling during the manufacture of the glass. In practice, sealing strips of plastics materials might be used instead of metal sealing strips. The grooves or the like will preferably be formed in the facing surfaces of the glass sheets. Thicker glass sheets may also be formed with grooves in their outside edge faces.

In a preferred embodiment of the invention, the grooves are undercut at least on one side, e.g., like a dovetail groove. If that portion of the grooves which is clear of the longitudinal edges of the sealing strips in this embodiment is at least partly filled with a sealing material and/or the longitudinal edge portion of the sealing strips is enlarged in thickness or has a profile conforming to the cross-section of the grooves, the grooves having this profile will ensure a reliable retention of the sealing strip and of any flowed-in sealing material. The latter may preferably consist of a fusible solder in conjunction with metallic sealing strips or, if the sealing strips are made from plastics materials, the sealing material may consist of a synthetic resin which bonds to the sealing strips. If the grooves are formed in the facing surfaces of the sheets, the sealing strips are capable of transmitting tensile stresses because the undercut face prevents a pulling of the longitudinal edges of the strips and of any flowed-in sealing material out of the grooves. The desired seal is largely obtained as a result of the special configuration of the joint between the glass and the sealing strips, i.e., as a result of the interengagement of the strips and the grooves. In the previous design only the soldered joints were relied upon for the proper holding of the glass sheets in the desired position and for the seal.

Further details and suitable embodiments of the invention will become apparent from the following description of the accompanying drawings, in which—

Figure 2:
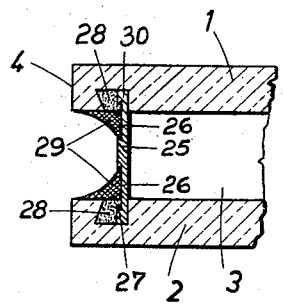

FIG. 1 is a perspective view showing a corner of a composite glass panel according to the invention and FIG. 2 is a sectional view showing the edge portions of a composite glass panel according to the invention.

The illustrated composite glass panel comprises two glass sheets 1, 2, which define between them a space 3, which is sealed from the outside. The facing plane surfaces of the glass sheets 1, 2 are formed with peripheral grooves 5, which are closely spaced from the outer edge 4 and the inner side face 6 of which is normal to the surfaces 7 of the sheets. The outer side faces 8 of the grooves are undercut like one side of a dovetail groove. The grooves 5 receive sealing strips 9, the inner edges of which engage the side faces 6 of the grooves. A separate sealing strip 9 may be used for each side edge of the panel. In this case the sealing strips are soldered or welded together at the corners. Alternatively, a single sealing strip may be provided, which is closed in itself and angled at the corners. That portion of the groove which is not occupied by the sealing strip is filled by a material 10, which adheres tightly at least to the material of the sealing strips 9.

In the specific embodiment of FIG. 2, the facing surfaces of the glass sheets 1, 2 are formed with grooves spaced from the outside periphery 4, similarly to the arrangement of FIG. 1. A sealing strip 25 is provided. On that side which is accessible from the outside, this sealing strip has longitudinal recesses 26 in the form of shallow dovetail grooves. The outer side faces 27 of these recesses extend into the grooves which are filled with a fusible solder 28. That portion of the recesses 26 which remains free is filled with putty 29, which extends beyond the edge of the groove 5. The portion 30 in which the sealing strip 25 is increased in thickness enters the groove owing to the formation of the recesses 26 and contributes to a retention of the sealing strip 25 in the groove 5 by interengagement.

I claim:

1. A composite panel comprising two spaced apart, parallel transparent sheets having plane surfaces facing each other, the transparent sheets being alike and each having a peripheral edge portion as well as plane surfaces facing outwardly, one pair of said plane surfaces defining an undercut groove sunk into said first-named surfaces in the peripheral edge portion, a sealing strip having an outwardly facing side face, the edge portions of the sheets and the side face of the strip defining a peripheral recess, the side face defining a pair of longitudinal shallow grooves in communication with the peripheral recess and the grooves in the facing surfaces of the sheets, the sealing strip being disposed between said sheets adjacent the peripheral edge portions thereof, and extending into and engaging said groove, and a sealing material filling the shallow grooves in the side face of the strip and extending into the peripheral recess into engagement with the facing surfaces of the sheets to hold the sealing strip therein.

2. The composite panel of claim 1, wherein the shallow grooves in the side face of the strip are undercut.

References Cited by the Examiner

UNITED STATES PATENTS

| | | | |
|---|---|---|---|
| 1,818,404 | 8/1931 | Kaufman | 20—56.4 X |
| 2,094,381 | 9/1937 | Slayter | 52—616 |
| 2,173,213 | 9/1939 | Maul | 52—308 |
| 2,273,733 | 2/1942 | Paddock | 52—308 X |
| 2,306,327 | 12/1942 | Baldwin et al. | 52—172 |
| 2,597,097 | 5/1952 | Haven | 52—304 X |
| 2,756,467 | 7/1956 | Etling | 52—304 X |
| 3,030,673 | 4/1962 | London | 52—304 X |

FOREIGN PATENTS

| | | |
|---|---|---|
| 554,406 | 2/1957 | Belgium. |
| 670,401 | 9/1963 | Canada. |
| 537,912 | 7/1941 | Great Britain. |
| 462,648 | 3/1951 | Italy. |

FRANK L. ABBOTT, *Primary Examiner.*

M. O. WARNECKE, *Assistant Examiner.*